United States Patent
Jeon et al.

(10) Patent No.: US 11,115,107 B2
(45) Date of Patent: Sep. 7, 2021

(54) COMMUNICATION RECEIVING DEVICE AND METHOD FOR OPERATING THE SAME

(71) Applicant: SAMSUNG ELECTRONICS CO., LTD., Suwon-si (KR)

(72) Inventors: Hyun Bae Jeon, Suwon-si (KR); Jun Ha Im, Suwon-si (KR); Hyeon Cheol Jeong, Suwon-si (KR); Sung Soo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/856,215

(22) Filed: Apr. 23, 2020

(65) Prior Publication Data

US 2021/0067235 A1 Mar. 4, 2021

(30) Foreign Application Priority Data

Aug. 27, 2019 (KR) .................. 10-2019-0104900

(51) Int. Cl.
*H04B 7/02* (2018.01)
*H04B 7/08* (2006.01)
*H04L 27/26* (2006.01)
*H04W 84/12* (2009.01)

(52) U.S. Cl.
CPC ....... *H04B 7/0854* (2013.01); *H04L 27/2649* (2013.01); *H04W 84/12* (2013.01)

(58) Field of Classification Search
CPC ... H04B 7/0854; H04L 27/2649; H04W 84/12
USPC ........ 375/267, 262, 261, 259, 219, 295, 316
See application file for complete search history.

(56) References Cited

U.S. PATENT DOCUMENTS

| | | | |
|---|---|---|---|
| 9,674,011 B1* | 6/2017 | Sun ................. | H04L 25/061 |
| 9,853,845 B2 | 12/2017 | Li et al. | |
| 9,867,082 B2 | 1/2018 | Kenney et al. | |
| 9,882,687 B2 | 1/2018 | Park et al. | |
| 10,122,510 B2 | 11/2018 | Azizi et al. | |
| 10,200,225 B2 | 2/2019 | Zhang et al. | |
| 2010/0202301 A1 | 8/2010 | Wen et al. | |
| 2016/0105261 A1* | 4/2016 | Suh ................. | H04W 84/12 |
| | | | 370/338 |
| 2016/0227436 A1 | 8/2016 | Vermani et al. | |
| 2017/0085406 A1 | 3/2017 | Li et al. | |

(Continued)

FOREIGN PATENT DOCUMENTS

WO 2017073011 5/2017

OTHER PUBLICATIONS

European Search Report dated Dec. 14, 2020 in corresponding European Application No. 20186599.5 (7 pages).

*Primary Examiner* — Zewdu A Kassa
(74) *Attorney, Agent, or Firm* — F. Chau & Associates, LLC (57) ABSTRACT

A communication receiving device is provided. The communication receiving device includes a cross-correlation measuring circuit which receives an L-SIG (Legacy signal) symbol and a RL-SIG symbol to measure a cross-correlation degree therebetween, an accumulating circuit which accumulates a real part of a cross-correlation degree measurement value, a comparator which compares the accumulated L-SIG symbol and the RL-SIG symbol with a variable threshold value, and a threshold value calculator for calculating the threshold value.

18 Claims, 8 Drawing Sheets

(56) References Cited

U.S. PATENT DOCUMENTS

2017/0208153 A1\* 7/2017 Li .................... H04L 27/2607
2018/0048503 A1 2/2018 Kim et al.

\* cited by examiner

COMMUNICATION RECEIVING DEVICE AND METHOD FOR OPERATING THE SAME

CROSS-REFERENCE TO RELATED APPLICATION

This application claims priority to Korean Patent Application No. 10-2019-0104900, filed on Aug. 27, 2019 in the Korean Intellectual Property Office, and all the benefits accruing therefrom under 35 U.S.C. § 119, the disclosure of which is incorporated herein by reference in its entirety.

TECHNICAL FIELD

The present disclosure relates generally to a communication receiving device and a method for operating the same, and more particularly to improvements in Wi-Fi data communication.

DISCUSSION OF THE RELATED ART

The IEEE 802.11 Wi-Fi standard has been evolving over the past two decades, with each progressive version typically bringing faster communication speeds and/or longer coverage distances. A newly proposed version, designated IEEE 802.11ax but also called high efficiency (HEW) WLAN (wireless local area network) or Wi-Fi 6, is under discussion by a next generation WLAN task group. The proposed 802.11ax includes: 1) improvements involving the 802.11 PHY (physical) layer and the MAC (medium access control) layer in bands such as 2.4 GHz and 5 GHz; 2) improvements in spectrum efficiency and area throughput; and 3) performance improvements in real indoor and outdoor environments. Examples of such environments include a dense heterogenous network environment, or environments with an indirect source or a high user load.

SUMMARY

Aspects of the inventive concept provide an IEEE 802.11ax communication receiving device with improved communication reliability.

Aspects also provide a method for operating an IEEE 802.11ax communication receiving device with improved communication reliability.

According to an aspect of the present inventive concept, there is provided a communication receiving device including a cross-correlation measuring circuit configured to repetitively measure a cross-correlation degree between a received legacy signal symbol ("L-SIG") of a preamble within a data frame, and a second symbol succeeding L-SIG; an accumulating circuit configured to accumulate a real part of results of the repetitive cross-correlation degree measurements; a comparator configured to compare the accumulated real part of the results with a variable threshold value and based on the comparison, to indicate whether the second symbol is a repeated symbol ("RL-SIG") of L-SIG; and a threshold value calculator that calculates the variable threshold value.

Each of L-SIG and the second symbol may be a symbol of a received orthogonal frequency division multiplexed (OFDM) signal having a plurality of sub-carriers. The cross-correlation measuring circuit may repetitively measure the cross-correlation degree by measuring a cross-correlation degree between corresponding ones of the plurality of sub-carriers of L-SIG and the second symbol within a sub-carrier set. The accumulating circuit may accumulate the real part of the results over the sub-carrier set.

According to an aspect of the present inventive concept, there is provided a communication receiving device comprising an EVM (Error Vector Magnitude) circuit which detects whether there is an error in the RL-SIG symbol after demodulating an L-SIG (Legacy signal symbol) and a subsequent OFDM (Orthogonal Frequency Division Multiplexing) of the L-SIG symbol, a cross-correlation measuring circuit which receives the L-SIG symbol and the RL-SIG symbol to measure a cross-correlation, an accumulator which accumulates a real part of a cross-correlation degree measurement value, a comparator which compares the accumulated L-SIG symbol and the RL-SIG symbol with a threshold value, the threshold value being variable depending on a predetermined characteristic value, and a validation circuit which demodulates and decrypts the L-SIG symbol to verify validity.

According to an aspect of the present inventive concept, there is provided a method for operating a communication receiving device, the method comprising, receiving an L-SIG (Legacy signal) symbol and a RL-SIG symbol through a cross-correlation measuring circuit to measure a cross-correlation, accumulating a real part of a cross-correlation degree measurement value through an accumulator, comparing the accumulated L-SIG symbol and the RL-SIG symbol with a variable threshold value through a comparator, and calculating the threshold value through a threshold value calculator.

It should be noted, however, that aspects of the inventive concept are not restricted to those set forth herein. The above and other aspects of the inventive concept will become more apparent to one of ordinary skill in the art to which the inventive concept pertains by referencing the detailed description given below.

BRIEF DESCRIPTION OF THE DRAWINGS

The above and other aspects and features of the present inventive concept will become more apparent by describing in detail exemplary embodiments thereof with reference to the attached drawings, in which like reference characters denote like elements or features, wherein.

DETAILED DESCRIPTION OF EMBODIMENTS

In various versions of the IEEE 802.11 standard, the frequency or frequencies, the modulation type and the maximum data transmission rate are prescribed. In particular, an orthogonal frequency division multiplexing (OFDM) modulation type may be prescribed in standards (interchangeably, "versions") such as 802.11a, 802.11g, 802.11n, and 802.11ac. Some versions may designate operations at the same frequency and the same bandwidth.

To distinguish 802.11 versions that prescribe the same frequency and bandwidth, phases of preamble symbols may be differently implemented within each version, and the communication receiving device may distinguish each version through the preamble symbol.

In the 802.11ax standard, to distinguish the format from the legacy versions as noted above, a transmitting device may transmit a preamble in a transmission frame format that includes a legacy signal (L-SIG) symbol followed by a Repeated L-SIG ("RL-SIG") symbol. The RL-SIG symbol may be a duplicate of the L-SIG symbol. In accordance with embodiments herein, the communication receiving device may measure a cross-correlation degree between the L-SIG symbol and the RL-SIG symbol to determine whether the transmission format is an 802.11ax format Physical Protocol Data Unit (PPDU). Hereafter, the L-SIG symbol and the RL-SIG symbol will be referred to interchangeably as just "L-SIG" and "RL-SIG", respectively.

In embodiments herein, to obtain the cross-correlation degree between L-SIG and RL-SIG, a cross-correlation degree may be obtained in the time domain before a Fast Fourier Transform (FFT) is performed (computed). Alternatively, to obtain the cross-correlation degree between L-SIG and RL-SIG, the cross-correlation degree may be obtained in the frequency domain after the FFT is performed.

In the time domain, inter symbol interference (ISI) may be severe due to the characteristics of wireless LAN. Therefore, when a noise level due to ISI is high, a problem may arise in which cross-correlation characteristics may deteriorate. For this reason, to obtain the cross-correlation degree between L-SIG and RL-SIG, the cross-correlation degree may be obtained in the frequency domain after the FFT is performed.

However, since the number of valid subcarriers of the L-SIG symbol may only be 48 among 64 possible subcarriers in a prescribed band, it may be similarly difficult to distinguish the 802.11ax format from the cross-correlation of the frequency domain in channels with small channel coefficients or high noise level.

The communication receiving device and the method for operating the communication receiving device according to some embodiments for efficiently distinguishing an IEEE 802.11ax PPDU, also called a High Efficiency (HE) PPDU, from a PPDU of legacy versions of the IEEE 802.11 standard (prior to 802.11ax) will be described with reference to FIGS. 1 to 9 below.

Figure 1:
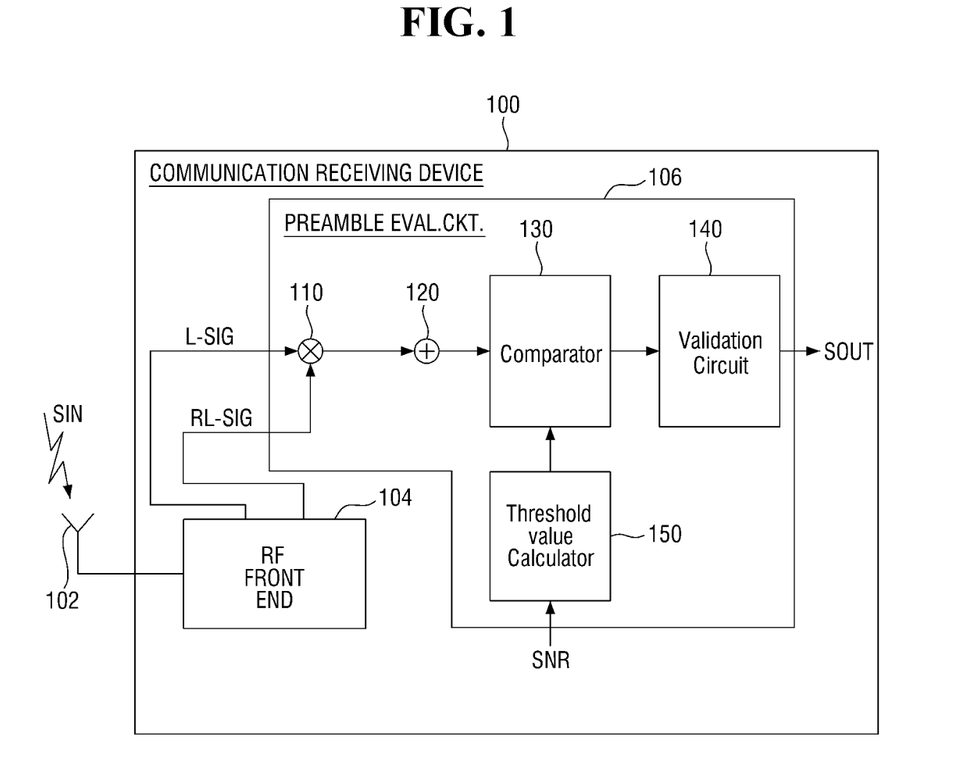
FIG. 1 is an exemplary block diagram for explaining the communication receiving device according to some embodiments.

FIG. 1 is a block diagram showing components of an example communication receiving device, 100, according to some embodiments. The communication receiving device 100 may include an antenna 102 (e.g. an antenna array) for receiving an input signal $S_{IN}$, a radio frequency (RF) front end 104 coupled to the antenna 102, and a preamble evaluation circuit 106. The preamble evaluation circuit 106 may include a cross-correlation measuring circuit 110, an accumulator 120, a comparator 130, a threshold value calculator 150, and a validation circuit 140.

The signal $S_{IN}$ received by the antenna 102 is processed by the RF front end 104 to provide L-SIG and RL-SIG (shown in separate signal paths but typically flowing over the same signal path between the RF front end 104 and the circuit 110.) The RF front end 104 may typically include at least one filter, amplifier, sample and hold circuit, A/D converter, and demodulator, all not shown in FIG. 1. In various versions of the 802.11 standard, the signal $S_{IN}$ is transmitted from a transmitting device (not shown) in a format that includes one or more preambles followed by a data field. In 802.11ax, the one or more preambles comprises two preambles: a legacy preamble followed by an HE preamble. The last field within the legacy preamble contains the L-SIG symbol, and a first field within the HE preamble contains the RL-SIG symbol. Thus, RL-SIG immediately succeeds L-SIG in 802.11ax. In legacy 802.11 versions, the RL-SIG symbol does not succeed the L-SIG symbol. Herein, a symbol immediately following L-SIG (referred to herein as a "second symbol" or a "subsequent symbol") is RL-SIG when the signal $S_{IN}$ is an 802.11ax signal, and is another OFDM symbol in the case where $S_{IN}$ is a legacy 802.11 version signal.

The cross-correlation measuring circuit 110 may measure the cross-correlation degree between L-SIG and the second symbol (RL-SIG in the case of 802.11ax). In this measurement, the k-th subcarrier signal in the frequency domain of L-SIG and the second symbol may be represented by $X_0(k)$ and $X_1(k)$, respectively. In 802.11ax, these represent L-SIG and RL-SIG waveforms as they were transmitted, without the effects of the physical wireless channel. The cross-correlation measuring circuit 110 may measure the cross-correlation degree between L-SIG and the second symbol for each of a plurality of corresponding sub-carriers between L-SIG and the second symbol. In this regard, the cross-correlation measuring circuit 110 may be said to repetitively measure a cross-correlation degree between L-SIG and the second symbol (e.g., by effectively measuring the cross-correlation degree between corresponding portions of the L-SIG symbol and the second symbol in the frequency domain.)

In the communication receiving device 100 according to some embodiments, $X_0(k)$ and $X_1(k)$ may be converted into $Y_0(k)$ and $Y_1(k)$ in accordance with equations (1) and (2), respectively:

$$Y_0(k)=H_0(k)X_0(k)+W_0(k) \qquad \text{(eqn. 1)}$$

$$Y_1(k)=H_1(k)X_1(k)+W_1(k) \qquad \text{(eqn. 2)}$$

where $H_i(k)$ represents a channel coefficient of the $i^{th}$ channel, and $W_i(k)$ represents complex gaussian noise having an average value of $X_i(k)$ and a dispersion of $\sigma^2$. Note that $H_i(k)$ may be determined by device 100 in any suitable way.

A cross-correlation degree $C_f$ between the L-SIG symbol and the second symbol (e.g., RL-SIG) may be measured according to equation 3:

$$C_f = \frac{\sum_{k \in Nsd} Y0(k)Y1^*(k)}{\sqrt{P_0}\sqrt{P_1}} \qquad \text{(eqn. 3)}$$

where κsd represents a set of subcarrier indices included in the measurement of the cross-correlation degree. $\overline{P_1}$ may be expressed by equation (4) as an average value of the received power of $Y_i(k)$:

$$\overline{P_1} = \frac{1}{\aleph sd} \sum_{k \in \aleph sd} |Y_i(k)|^2 \quad \text{(eqn. 4)}$$

Also, since the L-SIG symbol and the subsequent OFDM symbol (second symbol) may be repeatedly transmitted as a signal of 20 MHz in the band of 40 MHz, 80 MHz or 160 MHz, the equation of measuring the cross-correlation degree using a number $N_{valid\_band}$ of valid 20 MHz bands and its start frequency index $N_{off\_band}$ may be extended to Equation 5 as follows.

$$C_f = \frac{\sum_{b=0}^{N} \text{valid\_band}^{-1} \sum_{i \in \aleph sd, 20M} Y0(64 \times (N_{off_{band}} + b) + i) Y1^*(64 \times (N_{off_{band}} + b) + i)}{\sqrt{P_0} \sqrt{P_1}}. \quad \text{(eqn. 5)}$$

In equation 5, κsd,20M={4, 5, 6, 7, 8, 9, 10, 12, 13, 14, 15, 17, 18, 19, 20, 21, 22, 23, 24, 26, 27, 28, 29, 30, 31, 33, 34, 35, 36, 37, 38, 40, 41, 42, 43, 44, 45, 46, 47, 48, 49, 50, 51, 52, 54, 55, 56, 57, 58, 59, 60} may represent a set of subcarrier indices in the 20 MHz band included in an "accumulated" cross-correlation measurement. For example, the accumulator 120 may accumulate the individual sub-carrier results performed by the cross-correlation measuring circuit 110.

The cross-correlation characteristics of an HE-type PPDU may be improved by including four subcarriers of both edges in the set of subcarrier indexes in the 20 MHz band.

After measuring the cross-correlation degree between L-SIG and the second symbol (e.g., RL-SIG) in the cross-correlation measuring circuit 110, a real part of the cross-correlation degree measurement value may be accumulated in the accumulator 120. In other words, after the cross-correlation measuring unit 110 performs a plurality of measurements for a plurality of respective sub-carriers of L-SIG and the second symbol (in a set of sub-carriers within each of L-SIG and the second symbol), the accumulator 120 accumulates at least the real part of the measurement results over the set of sub-carriers.

The comparator 130 may compare the accumulated real part of the cross-correlation degree output by the accumulator 120 with a threshold value (e.g. $T_{RL-SIG}$ of eqns. 6 and 7 below). For instance, the comparator 130 may compare the real part of the measured cross-correlation degree with the threshold value to determine the validity of the RL-SIG symbol (e.g., whether the second symbol is in fact RL-SIG) from hypothesis testing.

For example, when the comparator 130 compares the real part of the cross-correlation degree output by the accumulator 120 with the threshold value and a first hypothesis determination ($P_0$ of equation 6 below) is satisfied, the comparator 130 may provide a signal to the validation circuit 140 indicating that $Y_1(k)$ is a valid RL-SIG symbol, whereby device 100 may initiate a procedure for processing the IEEE 802.11ax format PPDU.

When the comparator 130 compares the real part of the cross-correlation degree output by the accumulator 120 with the threshold value (e.g., $T_{RL-SIG}$ of equation 6 and equation 7) and a second hypothesis determination ($P_1$ of equation 6) is satisfied, the comparator 130 may output a signal indicating that Y1(k) is not a valid RL-SIG symbol. In response, the validation circuit 140/other processors within device 100 performs a format detection process of a legacy format, or a format other than the IEEE 802.11ax format.

$$P_0: \text{Real}(C_f) \geq T_{RL-SIG} \quad \text{(eqn. 6)}$$

$$P_1: \text{Real}(C_f) < T_{RL-SIG} \quad \text{(eqn. 7)}$$

The threshold value calculator 150 may calculate a threshold value (e.g. $T_{RL-SIG}$ of equations 6 and 7) compared by the comparator 130. The threshold value may be dynamically varied on the basis of an external value (e.g., a signal to noise ratio (SNR)).

It is possible to have a cumulative distribution function of the real part of the cross-correlation degree measurement value of IEEE 802.11ax (HE) and IEEE 802.11a (non-HE) according to various PDU lengths. The L-SIG symbol may include only Protocol Data Unit (PDU) length information and transmission rate information. Therefore, in the case of the HE PPDU format, there may be no change in the cumulative distribution function depending on the length of the PDU. However, in the case of the non-HE PPDU format, since there is a data symbol subsequent to L-SIG, the cross-correlation degree measurement value between L-SIG and the subsequent data may be exhibited differently depending on the PDU length.

In addition, it is possible to have a cumulative distribution function of the real part of the cross-correlation degree measurement value of the HE format PPDU and the non-HE format PPDU depending on various SNR values. In the case of the HE format PPDU, the SNR may be low, therefore the average value of the cross-correlation degree measurement value may decrease, and the variance may increase. For instance, in the non-HE format PPDU, the cross-correlation degree measurement value may be determined by the values of L-SIG and the symbol subsequent to L-SIG rather than the SNR. However, the cumulative distribution of the HE format PPDU may be determined by the SNR, regardless of the value of the subsequent symbol (e.g., RL-SIG symbol).

Therefore, there is a possibility that some of the real part of the cross-correlation degree measurement value of IEEE 802.11ax is included in the non-HE format PPDU distribution region at a low SNR. For this reason, the distinction between the non-HE format PPDU and the HE format PPDU may not be valid by a fixed threshold value.

A variable threshold value according to SNR ($T_{RL-SIG}$ of eqn. 6 and eqn. 7) may be utilized for efficient distinction between the non-HE format PPDU and the HE format PPDU. For instance, $T_{RL-SIG}$ may be calculated as in equation 8.

$$T'_{RL-SIG} = T_{RL-SIG}^1 \times f(SNR) \quad \text{(eqn. 8)}$$

where f(SNR) is a function having a SNR value as a variable, and for example, a step function of a simple form may be applied as in equation 9.

$$T'_{RL-SIG} = \begin{cases} T_{RL-SIG,0} & \text{if } SNR < SNR0 \\ T_{RL-SIG,2} & \text{else if } SNR > SNR1 \\ T_{RL-SIG,1} & \text{otherwise} \end{cases} \quad \text{(eqn. 9)}$$

The comparator 130 may compare the threshold value received from the threshold value calculator 150 with the calculated value of the real part of the cross-correlation degree measured by the cross-correlation measuring circuit 110 and output by the accumulator 120, and may transmit the result thereof to the validation circuit 140.

The validation circuit 140 may receive the result from the comparator 130, indicating whether the format is an HE format PPDU or a non-HE format PPDU, and demodulate and decode the L-SIG symbol to find the PDU length information and transmission rate information. For example, when the value of the length information of the L-SIG symbol is divided by 3 in the HE format PPDU, the remainder thereof may be defined to be 1 or 2 depending on the type of HE format PPDU.

Consequentially, in the case of the non-HE format PPDU, all the lengths of PDU should be a multiple of 3. In addition, in the HE format PPDU, the transmission rate information is defined as a standard to always be fixed at 6 Mbps.

For efficient HE format PPDU determination, the communication receiving device 100 according to some embodiments may further determine whether the received signal is an HE format PPDU through the validation circuit 140.

The cross-correlation measuring circuit 110, the accumulator 120, the comparator 130 and the validation circuit 140 may each be embodied as a processing circuit or a logic circuit. In an example, each of these circuits is part of one or more processors of an integrated circuit (IC) chip. The processor(s) may be a special purpose processor(s) or a general processor(s) that executes instructions read from a non-transitory memory (not shown) within device 100 to perform their respective operations described herein.

Figure 2:
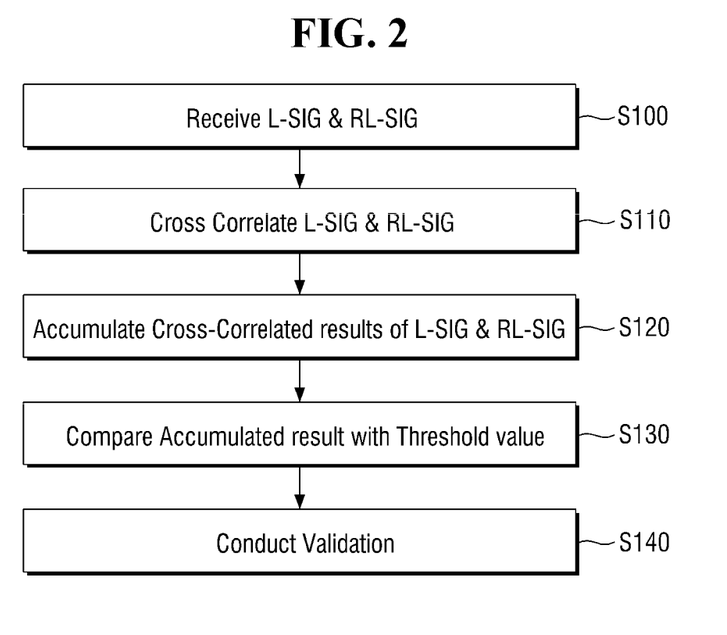
FIG. 2 is an exemplary flowchart for explaining a method for operating the communication receiving device according to some embodiments.

FIG. 2 is a flowchart of an example method for operating the communication receiving device 100 according to some embodiments.

Referring to FIGS. 1 and 2, L-SIG and R-SIG are received through the cross-correlation measuring circuit 110 (S100), and the cross-correlation degree between the L-SIG symbol (L-SIG) and the RL-SIG symbol (L-SIG) may be measured (S110).

For instance, the k-th subcarrier signal in the frequency domain of the L-SIG symbol (L-SIG) and the RL-SIG symbol (L-SIG) may be represented by $X_0(k)$ and $X_1(k)$, respectively.

In the communication receiving device 100 according to some embodiments, $X_0(k)$ and $X_1(k)$ may be converted into $Y_0(k)$ and $Y_1(k)$ in accordance with equation 1 and equation 2 written above, respectively. The cross-correlation degree between L-SIG and RL-SIG may be measured as $C_f$ of equation (2) above. This may be performed at S110 for each of a plurality of sub-carriers of the signal $S_{IN}$, which is an OFDM signal.

Also, since the L-SIG symbol (L-SIG) and the subsequent OFDM symbol may be repeatedly transmitted as a 20 MHz signal in the band of 40 MHz, 80 MHz or 160 MHz, the equation of measuring the cross-correlation degree using the number $N_{valid\_band}$ of valid 20 MHz bands and its start frequency index $N_{off\_band}$ may be extended to equation 5 above.

The cross-correlation characteristics of HE-type PPDU may be improved by including four subcarriers at both edges in the set of subcarrier indexes in the 20 MHz band.

After measuring the cross-correlation degree between L-SIG and R-SIG in the cross-correlation measuring circuit 110, the real part of the cross-correlation degree measurement value may be accumulated for all the sub-carriers in the accumulator 120 (S120).

Thereafter, the comparator 130 may compare the real part of the cross-correlation degree measured by the cross-correlation measuring circuit 110 with a threshold value ($T_{RL-SIG}$ in equations 6 and 7) (S120). For instance, the comparator 130 may compare the accumulated real part of the cross-correlation degree with the threshold value to determine the validation of the RL-SIG symbol from the hypothesis testing.

For example, the comparator 130 compares the real part of the cross-correlation degree with the threshold value, and if the first hypothesis determination ($P_0$ of eqn. 6) is satisfied, the comparator 130 may provide an output indicating that $Y_1(k)$ is a valid RL-SIG symbol (L-SIG) to perform the procedure for processing the IEEE 802.11ax format PPDU.

The comparator 130 compares the real part of the cross-correlation degree measured by the cross-correlation measuring circuit 110 with the threshold value, and if the second hypothesis determination ($P_1$ of equation 6) is satisfied, the comparator 130 may perform format detection procedures other than that for the IEEE 802.11ax format.

The threshold value calculator 150 may calculate a threshold value ($T_{RL-SIG}$ of equations 6 7) to be compared by the comparator 130. The threshold value may be varied on the basis of an external value (e.g., SNR).

It is possible to have a cumulative distribution function of the real part of the cross-correlation degree measurement values of IEEE 802.11ax HE and IEEE 802.11a (non-HE) according to various PDU lengths. The L-SIG symbol (L-SIG) may include only the PDU (Protocol Data Unit) length information and the transmission rate information. Therefore, in the case of the HE PPDU format, there may be no change in the cumulative distribution function depending on the length of the PDU. However, in the case of the non-HE PPDU format, since there is a data symbol subsequent to the L-SIG symbol (L-SIG), the cross-correlation degree measurement values between the L-SIG symbol (L-SIG) and the subsequent data may be exhibited differently depending on the PDU length.

In addition, it is possible to have a cumulative distribution function of the real part of the cross-correlation degree measurement value between the HE format PPDU and the non-HE format PPDU depending on various SNR values. In the case of HE format PPDU, as the SNR is low, the average value of the cross-correlation degree measurement value may decrease, and the variance may increase. That is, in the non-HE format PPDU, the cross-correlation degree measurement value may be determined by the values of the L-SIG symbol (L-SIG) and the symbol subsequent to the L-SIG symbol (L-SIG) rather than the SNR. However, the cumulative distribution of the HE format PPDU may be determined by the SNR, regardless of the value of the subsequent symbol (e.g., the RL-SIG symbol).

Therefore, there is a possibility that a part of the real part of the cross-correlation degree measurement value of IEEE 802.11ax is included in the non-HE format PPDU distribution region at a low SNR. For this reason, the distinction between the non-HE format PPDU and the HE format PPDU may not be valid by the fixed threshold value.

As mentioned variable threshold value according to the SNR may be utilized for efficient distinction between the non-HE format PPDU and the HE format PPDU. For example, the threshold value $T_{RL-SIG}$ may be calculated as in equation 8 above.

The comparator 130 may compare the threshold value received from the threshold value calculator 150 with the calculated value of the real part of the cross-correlation degree measured by the cross-correlation measuring circuit 110, and may transmit the result to the validation circuit 140.

In other words, the validation circuit 140 may receive the result of determining whether the signal received from the comparator 130 is an executed HE format PPDU/non-HE format PPDU, and demodulate and decode the L-SIG symbol (L-SIG) to find PDU length information and transmission rate information. For example, when the length information value of L-SIG symbol (L-SIG) is divided by 3 in the HE format PPDU, the rest may be defined to be 1 or 2 depending on the type of HE format PPDU.

Consequentially, in the case of the non-HE format PPDU, the entire length of PDU should be a multiple of 3. In addition, the transmission rate information in the HE format PPDU is set to always be fixed to 6 Mbps in the standard.

For efficient HE format PPDU determination, it is possible to further determine whether the received signal is an HE format PPDU through the validation circuit 140 in the communication receiving device according to some embodiments (S140).

Figure 3:
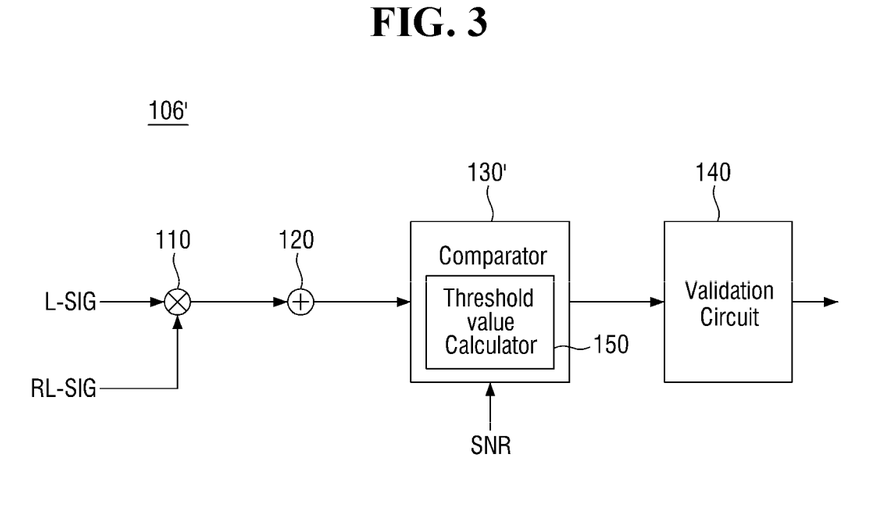
FIG. 3 is an exemplary block diagram for explaining a communication receiving device according to some embodiments.

FIG. 3 is a block diagram of another example communication receiving device according to some embodiments.

Referring to FIG. 3, the communication receiving device includes the preamble evaluation circuit 106' which differs from that of FIG. 1 by including a threshold value calculator 150 within a comparator 130'. Except for the threshold value calculator 150 of FIG. 5 is included in the comparator 130', the remaining aspects are the same as in FIG. 1, and thus redundant description thereof is omitted.

Figure 4:
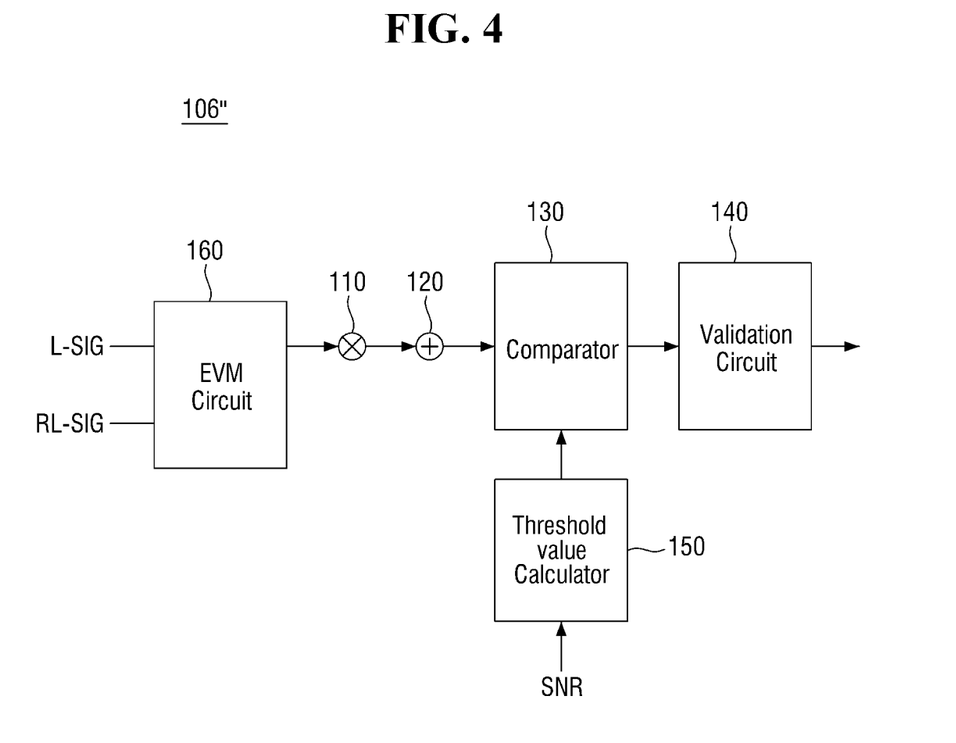
FIG. 4 is an exemplary block diagram for explaining a communication receiving device according to some embodiments.

FIG. 4 is an exemplary block diagram of another example communication receiving device according to some embodiments.

Referring to FIG. 4, the communication receiving device includes a preamble evaluation circuit 106'' that differs from that in FIG. 1 by including an Error Vector Magnitude (EVM) circuit 160 before the cross-correlation measuring circuit 110 to pre-determine whether the RL-SIG symbol is valid.

A method for determining the validity of the RL-SIG symbol (L-SIG) through the EVM calculation in the EVM circuit 160 will be described in detail with reference to FIGS. 5 through 7.

Figure 5:
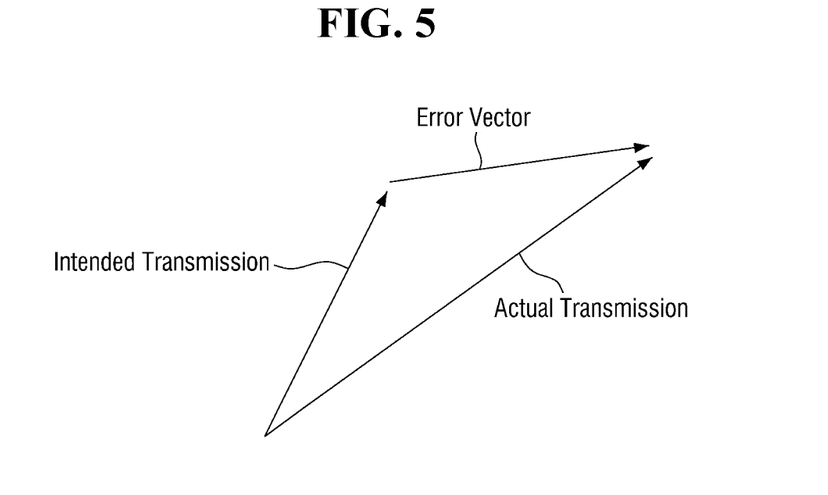
FIG. 5 is an exemplary diagram for explaining Error Vector Magnitude (EVM).

FIG. 5 is an exemplary diagram for explaining EVM. Referring to FIG. 5, a method for measuring EVM, which is a difference between an originally intended transmission signal and the actually transmitted signal, will be explained.

The error vector may be attributed to the problem that the transmission system is non-ideal. Therefore, EVM may be used as a performance parameter indicating signal quality degradation due to the transmission system performance. Satisfaction of an EVM specification may mean that the transmission system is implemented at an acceptable level at which a respective standard may be used.

Figure 6:
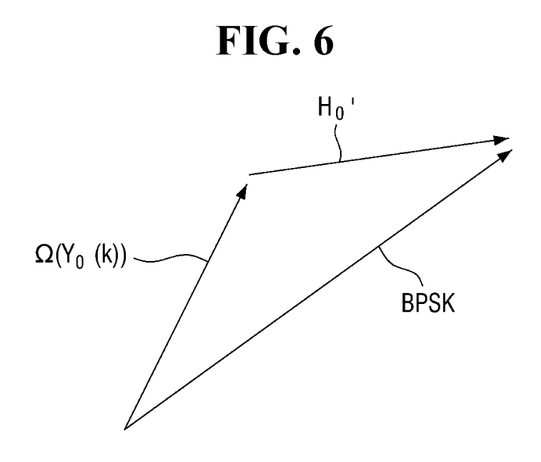
FIG. 6 is an exemplary diagram for explaining EVM according to some embodiments.

FIG. 6 is an exemplary diagram for explaining EVM according to some embodiments. EVM according to some embodiments may be obtained through a difference between a demodulated value ($\Omega(Y_0(k))$) of the L-SIG symbol and a binary phase-shift keying (BPSK) reference value. For instance, embodiments may obtain EVM through a comparison between the demodulated value ($\Omega(Y_0(k))$) of the L-SIG symbol and the BPSK reference value to detect the validity of the RL-SIG symbol in advance.

Figure 7:
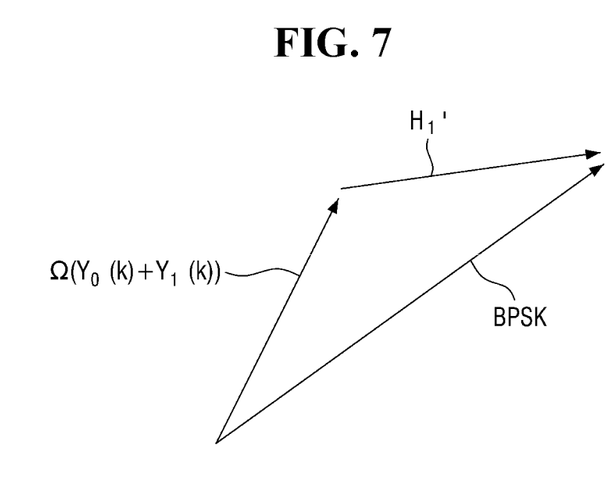
FIG. 7 is an exemplary diagram for explaining EVM according to some embodiments.

FIG. 7 is an exemplary diagram for explaining EVM according to some embodiments. EVM according to some embodiments may be obtained through a difference between a demodulated value ($\Omega(Y_0(k)+Y_1(k))$) of the L-SIG symbol and the subsequent OFDM symbol and the BPSK reference value. That is, the validity of the RL-SIG symbol may be detected in advance by obtaining the EVM through a comparison between the demodulated value ($\Omega(Y_0(k)+Y_1(k))$) of the L-SIG symbol and the subsequent OFDM symbol and the BPSK reference value.

For instance, if a hypothesis determination (E2 of eqn. 11 below) in which the EVM value through a comparison between the demodulated value ($\Omega(Y_0(k)+Y_1(k))$) of the L-SIG symbol and the subsequent OFDM symbol and the binary phase-shift keying (BPSK) is smaller than the threshold EVM2 ($T_{EVM2}$) is satisfied, the process of determining the HE format PPDU is followed.

$$E2: \mathrm{EVM}(\Omega(Y_0(k)+Y_1(k))) < T_{EVM2} \quad \text{(eqn. 11)}$$

Figure 8:
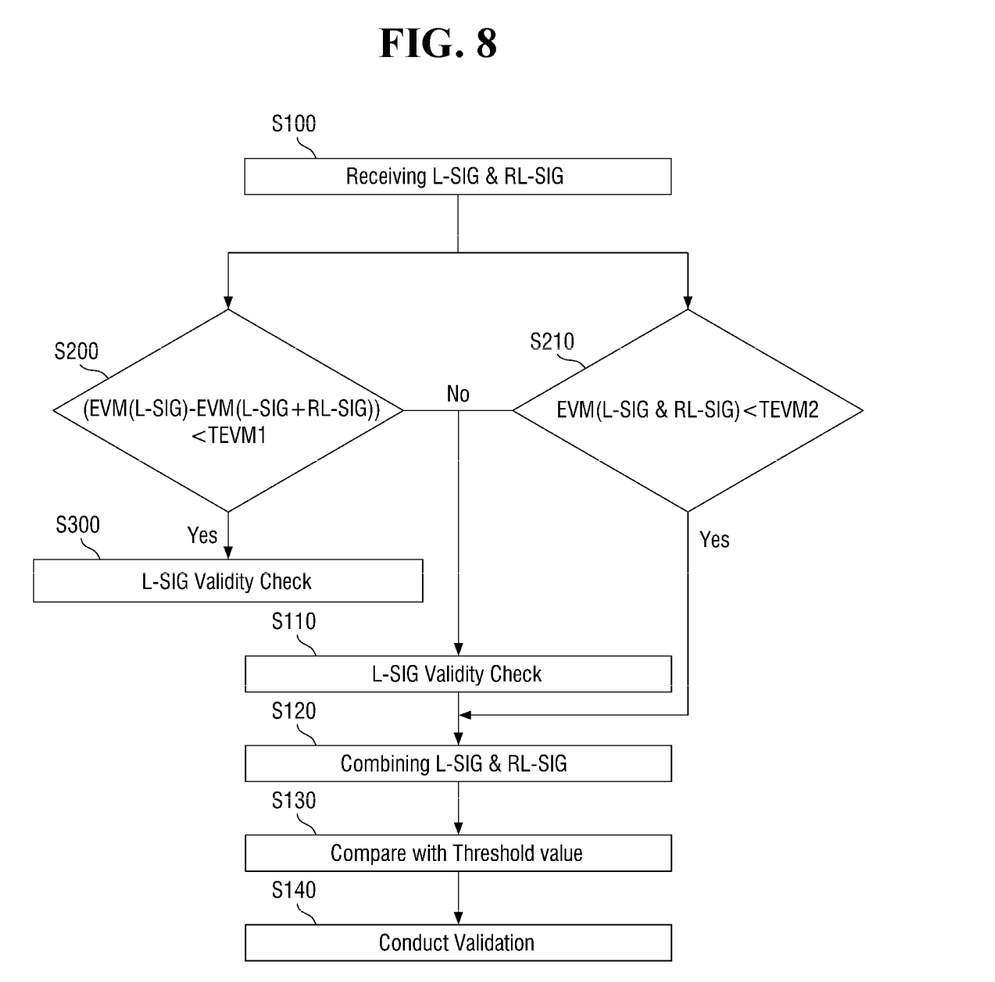
FIG. 8 is an exemplary flowchart for explaining a method for operating the communication receiving device according to some embodiments.

FIG. 8 is an exemplary flowchart for explaining a method for operating the communication receiving device according to some embodiments.

Referring to FIGS. 4 and 8, the EVM circuit 160 receives the L-SIG symbol (L-SIG) and the RL-SIG symbol (L-SIG) (S100). Thereafter, the EVM circuit 160 compares a difference between an EVM value obtained through the difference between the demodulated value ($\Omega(Y_0(k))$) of the L-SIG symbol and the BPSK reference value and the EVM value obtained through the difference between the demodulated value of the sum of the L-SIG symbol and the RL-SIG symbol and the BPSK reference value with the threshold EVM1 ($T_{EVM1}$) (S200).

At this time, if a hypothesis determination (E1 of equation 10 below) in which a difference between the EVM value obtained through the comparison between the demodulated value ($\Omega(Y_0(k))$) of the L-SIG symbol and the BPSK reference value and the EVM through the comparison between the demodulated value of the sum of the L-SIG symbol and the RL-SIG symbol and the BPSK reference value is smaller than the threshold EVM1 ($T_{EVM1}$) is satisfied, the EVM circuit 160 follows the process of discriminating the non-HE format PPDU (S300).

$$E1: \mathrm{EVM}(\Omega(Y_0(k))) - \mathrm{EVM}(\Omega(Y_0(k)+Y_1(k))) < T_{EVM1} \quad \text{(eqn. 10)}$$

In addition, the EVM circuit 160 compares the EVM obtained through the demodulated value ($\Omega(Y_0(k)+Y_1(k))$) of the L-SIG symbol and the subsequent OFDM symbol and the BPSK reference value with the threshold EVM2 ($T_{EVM2}$) (S210).

At this time, if a hypothesis determination (E2 of equation 11) in which the EVM value through the demodulated value ($\Omega(Y_0(k)+Y_1(k))$) of the L-SIG symbol and the subsequent OFDM symbol and the BPSK is smaller than the threshold EVM2 ($T_{EVM2}$) is satisfied, the EVM circuit 160 follows the process of discriminating the HE format PPDU (S120 to S140).

$$E2: \mathrm{EVM}(\Omega(Y_0(k)+Y_1(k))) < T_{EVM2} \quad \text{(eqn. 11)}$$

Since steps S100, S110, S120, S130, and S140 are the same as those of FIG. 2, the description thereof will be omitted.

Figure 9:
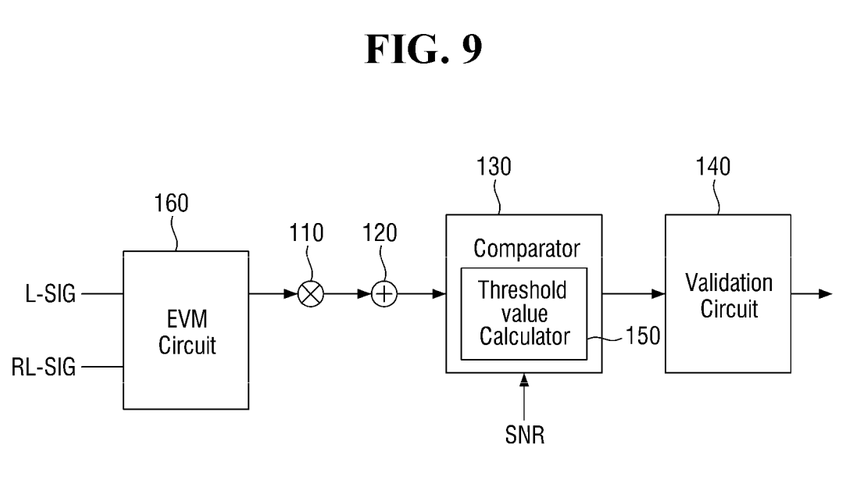
FIG. 9 is an exemplary block diagram for explaining the communication receiving device according to some embodiments.

FIG. 9 is an exemplary block diagram for explaining the communication receiving device according to some embodiments.

The embodiment of FIG. 9 differs from that of FIG. 4 in that the threshold value calculator 150 is included in the comparator 130. Other aspects are the same, and redundant description thereof is omitted.

In concluding the detailed description, those skilled in the art will appreciate that many variations and modifications may be made to the above-described embodiments without departing from the principles of the present inventive concept as defined by the appended claims. Therefore, it is understood that these embodiments are examples in a generic and descriptive sense only and not for purposes of limitation.

What is claimed is:

1. A communication receiving device comprising:
   a cross-correlation measuring circuit configured to repetitively measure a cross-correlation degree between a received legacy signal symbol ("L-SIG") of a preamble within a data frame, and a second symbol succeeding L-SIG;
   an accumulating circuit configured to accumulate a real part of results of the repetitive cross-correlation degree measurements;
   a comparator configured to compare the accumulated real part of the results with a variable threshold value and based on the comparison, to indicate whether the second symbol is a repeated symbol ("RL-SIG") of L-SIG;
   a threshold value calculator configured to calculate the variable threshold value; and
   an Error Vector Magnitude circuit configured to detect whether there is an error in RL-SIG after a demodulation of L-SIG and a subsequent Orthogonal Frequency Division Multiplexing (OFDM) symbol of L-SIG.

2. The communication receiving device of claim 1, wherein the threshold value calculator receives a signal to noise ratio (SNR), and dynamically calculates the variable threshold value in accordance with the SNR.

3. The communication receiving device of claim 2, wherein, if the cross-correlation degree between the accumulated L-SIG symbol and second symbol is larger than the threshold value, the comparator outputs a signal indicative of a high efficiency (HE) Physical Protocol Data Unit (PPDU).

4. The communication receiving device of claim 1, further comprising:
   a validation circuit which demodulates and decodes the L-SIG symbol to verify validity.

5. The communication receiving device of claim 4, wherein the validation circuit determines a non-HE PPDU when the demodulated and decoded L-SIG symbol is a multiple of 3.

6. The communication receiving device of claim 1, wherein the EVM circuit obtains an EVM value of an L-SIG symbol demodulated value obtained by demodulating the L-SIG symbol, obtains an EVM value of a demodulated value obtained by demodulating a sum of the L-SIG symbol and the RL-SIG symbol, and determines whether a difference between the EVM value of the L-SIG symbol demodulated value and the EVM value of the demodulated value of the sum of the L-SIG symbol and the RL-SIG symbol is smaller than a threshold EVM1,
   the EVM unit obtains the EVM value of the demodulated value of the L-SIG symbol and the subsequent OFDM symbol, and determines whether the demodulated value of the L-SIG symbol and the subsequent OFDM is smaller than a threshold EVM2, and
   when all of them are not satisfied, the EVM circuit performs a cross-correlation measurement on the L-SIG symbol and the RL-SIG symbol through the cross-correlation measuring circuit.

7. A communication receiving device comprising:
   an Error Vector Magnitude (EVM) circuit configured to detect whether there is an error in a repeated L-SIG ("RL-SIG") symbol after demodulating a legacy signal symbol ("L-SIG") and a Orthogonal Frequency Division Multiplexing (OFDM) symbol received subsequent to the L-SIG symbol;
   a cross-correlation measuring circuit configured to receive the L-SIG symbol and the RL-SIG symbol and measure a cross-correlation therebetween;
   an accumulator configured to accumulate a real part of a cross-correlation degree measurement value;
   a comparator configured to compare the accumulated L-SIG symbol and the RL-SIG symbol with a threshold value, the threshold value being variable depending on a predetermined characteristic value; and
   a validation circuit configured to demodulate and decode the L-SIG symbol to verify validity thereof.

8. The communication receiving device of claim 7, wherein the characteristic value comprises a signal to noise ratio (SNR).

9. The communication receiving device of claim 8, wherein, if the cross-correlation degree between the accumulated L-SIG symbol and RL-SIG symbol is larger than the threshold value, the comparator determines a HE (high efficiency) PPDU (Physical Protocol Data Unit).

10. The communication receiving device of claim 7, further comprising:
    a threshold value calculator which provides the threshold value to the comparator.

11. The communication receiving device of claim 7, wherein the validation circuit determines a non-HE PPDU when the demodulated and decrypted L-SIG symbol is a multiple of 3.

12. The communication receiving device of claim 7, wherein the EVM circuit obtains an EVM value of an L-SIG symbol demodulated value obtained by demodulating the L-SIG symbol,
    the EVM circuit obtains an EVM value of a demodulated value obtained by demodulating a sum of the L-SIG symbol and the RL-SIG symbol,
    the EVM circuit obtains an EVM value of a demodulated value of the L-SIG symbol and the subsequent OFDM symbol, and
    the EVM values are used for measuring whether to determine the cross-correlation measurement between the L-SIG symbol and the RL-SIG symbol.

13. The communication receiving device of claim 12, wherein the EVM circuit obtains an EVM value of an L-SIG symbol demodulated value obtained by demodulating the L-SIG symbol, obtains an EVM value of a demodulated value obtained by demodulating a sum of the L-SIG symbol and the RL-SIG symbol, and determines whether a difference between the EVM value of the L-SIG symbol demodulated value and the EVM value of the demodulated value of the sum of the L-SIG symbol and the RL-SIG symbol is smaller than a threshold EVM1,
    the EVM circuit obtains the EVM value of the demodulated value of the L-SIG symbol and the subsequent OFDM symbol, and determines whether the demodulated value of the L-SIG symbol and the subsequent OFDM symbol is smaller than a threshold EVM2, and
    when all of them are not satisfied, the EVM circuit measures the cross-correlation on the L-SIG symbol and the RL-SIG symbol through the cross-correlation measuring circuit.

14. A method for operating a communication receiving device, the method comprising:
    receiving a legacy signal ("L-SIG") symbol and a repeated symbol ("RL-SIG") of the legacy signal through a cross-correlation measuring circuit to measure a cross-correlation therebetween;

accumulating a real part of a cross-correlation degree measurement value through an accumulator;

comparing the accumulated L-SIG symbol and the RL-SIG symbol with a variable threshold value through a comparator;

calculating the threshold value through a threshold value calculator; and demodulating the L-SIG symbol and a subsequent OFDM (Orthogonal Frequency Division Multiplexing) symbol of the L-SIG symbol through an EVM (Error Vector Magnitude) circuit, and thereafter detecting whether there is an error in the RL-SIG symbol.

15. The method for operating the communication receiving device of claim 14, wherein the threshold value calculator receives a signal to noise ratio (SNR), and calculates the threshold value in accordance with the signal to noise ratio.

16. The method for operating the communication receiving device of claim 15, wherein, if the cross-correlation degree between the accumulated L-SIG symbol and RL-SIG symbol is larger than the threshold value, the comparator determines a HE (high efficiency) PPDU (Physical Protocol Data Unit).

17. The method for operating the communication receiving device of claim 14, further comprising:

decoding the L-SIG symbol to verify validity through a validation circuit.

18. The method for operating the communication receiving device of claim 17, wherein the validation circuit determines a non-HE PPDU when the demodulated and decrypted L-SIG symbol is a multiple of 3.

* * * * *